(12) United States Patent
Koyanagi et al.

(10) Patent No.: US 9,470,313 B2
(45) Date of Patent: Oct. 18, 2016

(54) METAL SEAL RING (76) Inventors: Satoru Koyanagi, Fukuoka (JP); Yumiko Otsu, Fukuoka (JP)

(*) Notice: Subject to any disclaimer, the term of this patent is extended or adjusted under 35 U.S.C. 154(b) by 291 days.

(21) Appl. No.: 13/201,807

(22) PCT Filed: Aug. 26, 2010

(86) PCT No.: PCT/JP2010/064465
§ 371 (c)(1),
(2), (4) Date: Sep. 14, 2011

(87) PCT Pub. No.: WO2011/024889
PCT Pub. Date: Mar. 3, 2011

(65) Prior Publication Data
US 2012/0139235 A1    Jun. 7, 2012

(30) Foreign Application Priority Data
Aug. 26, 2009 (JP) .................................. 2009-195838

(51) Int. Cl.
| | | |
|---|---|---|
| *F16L 23/00* | (2006.01) | |
| *F16J 15/08* | (2006.01) | |
| *F16L 17/025* | (2006.01) | |
| *F16L 23/20* | (2006.01) | |

(52) U.S. Cl.
CPC ......... *F16J 15/0887* (2013.01); *F16J 15/0881* (2013.01); *F16L 17/025* (2013.01); *F16L 23/20* (2013.01)

(58) Field of Classification Search
USPC ....................................... 285/336, 368, 917
See application file for complete search history.

(56) References Cited

U.S. PATENT DOCUMENTS

| | | | | |
|---|---|---|---|---|
| 1,339,636 | A | * | 5/1920 | Tulloch .................... 285/109 |
| 1,866,160 | A | * | 7/1932 | Griswold, Jr. ............. 285/340 |
| 2,211,983 | A | * | 8/1940 | Parris ....................... 285/110 |
| 3,184,246 | A | * | 5/1965 | Kline ........................ 277/612 |
| 3,239,245 | A | * | 3/1966 | Press et al. ................ 285/18 |
| 3,285,615 | A | * | 11/1966 | Trbovich .................. 277/639 |
| 3,643,965 | A | * | 2/1972 | Nicholson ................ 277/645 |
| 3,713,660 | A | * | 1/1973 | Luthe ........................ 277/644 |
| 4,361,331 | A | * | 11/1982 | Kohler ............. F16J 15/0887 277/314 |

(Continued)

FOREIGN PATENT DOCUMENTS

| | | |
|---|---|---|
| CN | 1462349 A | 12/2003 |
| CN | 1692245 A | 11/2005 |

(Continued)

OTHER PUBLICATIONS

Chinese Office Action with English translation dated Feb. 28, 2014 corresponding to Chinese Application No. 201080045565.1.

*Primary Examiner* — Aaron Dunwoody
(74) *Attorney, Agent, or Firm* — Patrick M Dwyer (57) ABSTRACT

A metal seal ring by which conduits are hermetically engaged by a pressure in accordance with a fluid pressure. The metal seal ring is comprised of a first annular seal surface, a second annular seal surface a pressure receiving surface which is formed between a first and second seal surfaces and which defines an annular recessed portion, and an annular seal portion comprised of a first seal portion and a second seal portion which are both elastically deformable and both formed between the annular recessed portion and the second seal surface. Additionally, an annular seal ring main body is provided on the radially outer side of the seal portion to prevent the first and second flanges from moving closer to the metal seal ring in the axial direction.

4 Claims, 5 Drawing Sheets

(56) References Cited

U.S. PATENT DOCUMENTS

| | | | |
|---|---|---|---|
| 4,741,541 A * | 5/1988 | Franken | 277/359 |
| 4,877,272 A * | 10/1989 | Chevallier et al. | 285/111 |
| 4,998,740 A * | 3/1991 | Tellier | 277/362 |
| 5,076,617 A * | 12/1991 | Bronnert | 277/608 |
| 5,123,678 A * | 6/1992 | Froger et al. | 285/110 |
| 5,246,236 A * | 9/1993 | Szarka et al. | 277/337 |
| 5,354,072 A * | 10/1994 | Nicholson | 277/647 |
| 5,669,612 A * | 9/1997 | Nicholson | 277/614 |
| 5,730,445 A * | 3/1998 | Swensen et al. | 277/647 |
| 6,899,341 B2 * | 5/2005 | Neumaier | 277/647 |
| 7,073,796 B2 * | 7/2006 | Tanioka et al. | 277/626 |
| 2004/0041353 A1 | 3/2004 | Tanioka et al. | |
| 2006/0055122 A1 | 3/2006 | Ito et al. | |

FOREIGN PATENT DOCUMENTS

| | | |
|---|---|---|
| JP | 3-113176 A | 5/1991 |
| JP | 2002-364750 A | 12/2002 |
| JP | 2004-176835 A | 6/2004 |
| JP | 2008-303894 A | 12/2008 |

* cited by examiner

METAL SEAL RING

CROSS-REFERENCE TO RELATED APPLICATION

This application is a National Stage entry of International Application No. PCT/JP2010/064465, filed Aug. 26, 2010, which claims priority to Japanese Patent Application No. 2009-195838, filed Aug. 26, 2009 the disclosure of the prior applications are incorporated in its entirety by reference

TECHNICAL FIELD

The present invention relates to a metal seal and, specifically, to a metal seal ring suitable for sealing (tight seal) between connecting end portions of ducts and a duct apparatus using the metal seal ring.

BACKGROUND ART

A flange coupling is widely used for connecting end portions of ducts. The flange coupling is a member configured to couple flanges provided at the end portions of the ducts and butted to each other by tightening with tightening members such as bolts and nuts.

The flange coupling as described above is generally provided with a seal ring such as an O-ring clamped between the flanges so as to prevent fluid passing in the interior of the ducts to be connected from leaking to the outside through between the butted flanges.

However, the seal ring is generally formed of rubber or resin, deterioration over time may occur, and hence regular replacement work is required and the replacement work in a duct apparatus or piping having a number of connecting portions is troublesome, so that lowering of efficiency of operation of the duct apparatus may be resulted. Also, when the duct apparatus is an apparatus which handles food, for example, there is a possibility that the smell of the O-ring is transferred to the food, or chips of the deteriorated O-ring are mixed into the food. In addition, the O-ring has low pressure-resistance and hence is not suitable for being used in the duct apparatus which handles high-pressure fluid and, in particular, it cannot be used in the duct apparatus which handles ultrahigh pressure fluid at tens of MPa such as liquefied hydrogen, which is increasingly needed in recent years. Furthermore, although the O-ring is set by being fitted to an annular grooves formed on surfaces of opposed flanges, in the case of the duct which handles food or the like, the food may get into the grooves, which is not preferable from the aspect of good hygiene and, in addition, there is also a problem in that disassembly and washing of the coupling become difficult.

In contrast, there is developed a metal seal ring, which is a seal ring formed of metal such as stainless or the like (for example, Patent Documents 1 and 2). Although the metal seal ring as described above has an advantage in being less deteriorated than those formed of rubber or resin, improvement in sealing capability and the like is required.

In contrast, a technology to connect the ducts without using packing has been developed (Patent Document 4). This technology achieves sealing by providing an annular projection having a tapered outer peripheral surface on an end flange of one of ducts to be joined, press-fitting the annular projection to a duct hole of a partner duct, and pressing the outer peripheral surface of the annular projection against an end edge of the duct hole. This technology allows the ducts to be coupled without the seal ring such as the O-ring, and is an effective member which can solve the above-described problem occurring when the seal ring is used.

CITED REFERENCE

Patent Document

Patent Document 1: JP-UM-A-5-79118
Patent Document 2: JP-A-2001-98317
Patent Document 3: JP-A-2004-12e5917
Patent Document 4: WO2004/109174

SUMMARY OF INVENTION

Problems to be Solved by the Invention

In view of such problems in the related art as described above, it is an object of the present invention to provide a metal seal ring which is improved in sealing property and can be used for sealing a duct apparatus which handles ultrahigh pressure fluid such as hydrogen gas or the like, and a piping device using the metal seal ring.

Means for Solving the Problems

In other words, the present invention provides
a metal seal ring set between first and second elements arranged so as to face each other at a distance and configured to seal between the first and second elements, including:
a sealing member including an annular first sealing surface set so as to come into contact with the first element and a pressure receiving surface defining an annular depression opening radially inward of the metal seal ring, the sealing member having an annular shape and including a resiliently deformable annular first sealing portion between the annular depression and the first sealing surface;
an annular seal ring body provided on the radially outside of the sealing member, the annular seal ring body engaging the first element when the metal seal ring is set by being clamped between the first and second elements to prevent the first element from approaching the metal seal ring in the axial direction and engaging the first element and being resiliently deformed to prevent the first sealing portion in sealed engagement with the first element from being further deformed.

With this metal seal ring, the annular seal ring body can set the first sealing portion into a state of being in sealed engagement with the first element while preventing the first sealing portion from being deformed beyond the limit of resiliency by being exerted with an excessive force from the first element. Therefore, when a pressure of high-pressure fluid is exerted from radially inside of the metal seal ring, the first sealing portion is pressed in the radial direction, so that the sealed engagement with respect to the first element is ensured. In addition, the first sealing portion, being deformed by the first element within the limit of resiliency, can be reused even after the first and second elements are disassembled.

Specifically, the seal ring body is configured to engage the first element after the first sealing portion engages the first element and is resiliently deformed thereby when the metal seal element is set by being clamped between the first and second elements. Accordingly, the first sealing portion can receive a required sealed engagement force with respect to the first element.

More specifically, the first sealing portion is formed into a shape approaching the first element as it goes radially inward from the seal ring body, and is configured to seal the first element in engagement at an extremity thereof. In this configuration, since the sealing is achieved at a radially innermost position of an area where the metal seal ring receives the fluid pressure, entry of a fluid between the metal seal ring and the first element can be minimized. This is specifically important for sealing a duct which handles liquid-state food.

the seal ring body includes an annular inner inclined surface approaching the first element as it goes radially outward from the sealing member, an outer inclined surface continued from the inner inclined surface extending away from the first element as it goes radially outward, and an annular ridge portion formed between the inner inclined surface and the outer inclined surface, so that the seal ring body engages the first element at the ridge portion. Although the sealed engagement with respect to the first element is achieved at the first sealing portion, by providing the ridge portion as described above on the seal ring body as well to achieve engagement with the first element at the ridge portion, secondary sealed engagement is formed at this portion and hence the sealing of the metal seal ring is further ensured.

In one embodiment, the metal seal ring is formed integrally with the second element. In other words, when the first and second elements are flanges provided at end portions of the ducts to be connected to each other, the metal seal ring is formed integrally with one of the flanges.

In another embodiment, the sealing member includes an annular second sealing surface set to come into contact with the second element, and a resiliently deformable annular second sealing portion between the second sealing surface and the annular depression, and the above-described annular seal ring body engages the first and second elements to prevent the first and second elements from approaching the metal seal ring in the axial direction when the metal seal ring is set by being clamped between the first and second elements, and engages the first and second elements respectively and being resiliently deformed thereby to prevent the first and second sealing portions in sealed engagement with the first and second elements from being further deformed.

Specifically, the seal ring body is configured to engage the first and second elements after the first and second sealing portions engage the first and second elements respectively and are resiliently deformed thereby to be brought into sealed engagement with the first and second elements when the metal seal element is set by being clamped between the first and second elements.

In other words, the sealed engagement with respect to the second element is achieved in the same manner as that with respect to the first element.

Also, the first and second sealing portions may approach the first and second elements respectively as they go radially inward from the seal ring body so as to seal the first and second elements in engagement at the extremities thereof. In this configuration, since the sealing is achieved at the radially innermost position of the area where the metal seal ring receives the fluid pressure, the entry of the fluid between the metal seal ring and the first and second elements can be minimized. This is specifically important for sealing a duct apparatus which handles liquid-state food.

The seal ring body may include outer inclined surfaces facing radially outward and approaching toward each other as they go radially outward. Alternatively, the seal ring body may include inner inclined surfaces facing radially inward and approaching toward each other as they go radially outward.

In this configuration, by providing the annular depressions on the opposed surfaces of the first and second elements, and setting the seal ring body between the annular depressions, for example, corner edges of the annular depressions extending in the annular shape along the annular depressions can be engaged with the outer inclined surfaces or the inner inclined surfaces. By the engagement between the corner edges and the inclined surfaces, stronger sealed engagement is achieved at the corresponding portions, so that the secondary sealed engagement with respect to the sealed engagement by the above-described sealing member is achieved.

Also, in another embodiment, the seal ring body includes outer inclined surfaces facing radially outward and having an annular shape approaching toward each other as they go radially outward, and inner inclined surfaces facing radially inward and having an annular shape approaching toward each other as they go radially inward, and annular ridge portions are formed between the outer inclined surfaces and the inner inclined surfaces.

In this case, the seal ring body engages the first and second elements at the ridge portion, and stronger sealed engagement is achieved by the corresponding portion.

The present invention also provides:

a duct apparatus including:

first and second ducts to be connected;

first and second flanges formed at end portions of the first and second ducts and arranged so as to oppose each other; and a metal seal ring to be set between the first and second flanges, wherein the metal seal ring includes:

an annular sealing member having an annular first sealing surface set so as to come into contact with the first flange, an annular second sealing surface set to come into contact with the second flange, and a pressure receiving surface formed between the first and second sealing surfaces and defining an annular depression opening radially inward of the metal seal ring, and including a resiliently deformable first sealing portion between the annular depression and the first sealing surface, and a resiliently deformable second sealing portion between the annular depression and the second sealing surface; and an annular seal ring body provided on the radially outside of the sealing member, the annular seal ring body engaging the first and second flanges respectively when the metal seal ring is set by being clamped between the first and second flanges to prevent the first and second flanges from approaching the metal seal ring in the axial direction and engaging the first and second flanges and being resiliently deformed to prevent the first and second sealing portions in sealed engagement with the first and second flanges from being further deformed.

In this duct apparatus, since the metal seal ring has a configuration as described above, the problems as described above in the duct apparatus in which an O-ring or the like is employed in the related art can be avoided. Also, since the material is metal, and the sealed engagement with respect to the flange is achieved by resilient deformation upon receipt of the pressure from fluid passing through the duct, adequate sealing operation can be performed even for the fluid at an ultrahigh pressure such as liquefied hydrogen.

Specifically, the seal ring body is configured to engage the first and second flanges after the first and second sealing portions engage the first and second flanges and are resiliently deformed thereby to be brought into sealed engagement with the first and second flanges when the metal seal ring is set by being clamped between the first and second flanges.

Also, at least one of opposed surfaces of the first and second flanges may be formed with an annular depression continuing to a fluid channel penetrating the flange from the duct so as to allow the metal seal ring to be set in the depression.

In this configuration, aligning of the metal seal ring with respect to the flanges is facilitated and, in addition, reliable holding of the metal seal ring is achieved.

Referring now to the attached drawings, an embodiment of the present invention will be described.

BEST MODES FOR CARRYING OUT THE INVENTION

Figure 1:
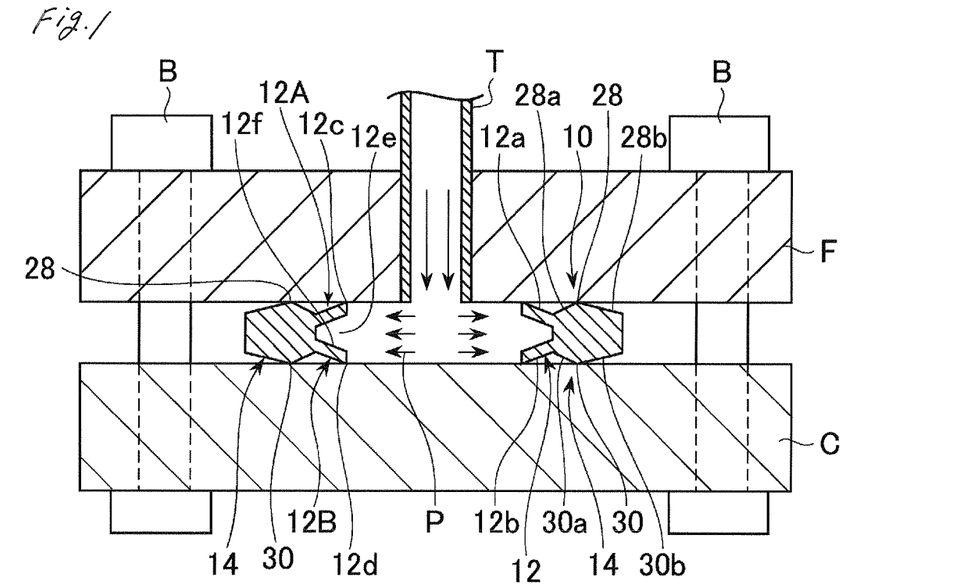
FIG. 1 is a vertical cross-sectional side view of a metal seal ring according to a first embodiment of the invention in a state of being clamped between a flange of a duct end portion and a closing member for closing an end opening of the duct of a compression testing device.

FIG. 1 shows part of an experimental arrangement used when a pressure test is conducted with respect to a metal seal ring 10 according to the present invention including a circular flange F fixed to an end of a duct T, a circular closing member C arranged so as to face the flange, and bolts and nuts B that clamp the flange F and the closing member C so as to attract each other and, although not shown, a pressurizing device which applies a fluid pressure P and a measuring device configured to measure the pressure are connected to the other end (upper end in FIG. 1) of the duct T.

The metal seal ring 10 is formed into an annular shape as a whole, and is set between a first element, that is, the flange F and a second element, that is, the closing member C to be sealed. The metal seal ring 10 includes an annular sealing member 12 on the radially inside and an annular seal ring body 14 at a position on the radially outside of the sealing member 12.

The sealing member 12 includes an annular first sealing surface 12a set so as to come into contact with a first element F, an annular second sealing surface 12b set so as to come into contact with a second element C, and a pressure receiving surface 12f defining an annular depression 12e opening radially inward of the metal seal ring 10. Specifically, the sealing member 12 includes an annular and resiliently deformable first sealing member 12A and a second sealing member 12B which extend toward the first element F and the second element C respectively as they go from the seal ring body 14 radially inward of the metal seal ring, and the first and second sealing members are configured to engage the first element F and the second element C at extremities (radially inside end portions) 12c, 12d, respectively. The first sealing member 12A is defined by the first sealing surface 12a and the pressure receiving surface 12f of the annular depression 12e, and is resiliently deformed toward the first element F by the fluid pressure P that the pressure receiving surface 12f receives, so that the first sealing surface 12a is pressed against the first element F to be sealed in engagement with the first element further strongly. The second sealing member 12B is defined by the second sealing surface 12b and the pressure receiving surface 12f of the annular depression 12e, and is resiliently deformed toward the second element F by the fluid pressure P that the pressure receiving surface 12f receives, so that the second sealing surface 12b is pressed against the second element F to be sealed in engagement with the second element further strongly.

When the metal seal ring 10 is set by being clamped between the first and second elements F, C, the annular seal ring body 14 engages the first and second elements F, C to prevent the first and second elements F, C from approaching the metal seal ring in the axial direction, and engages the first and second elements F, C respectively and being resiliently deformed thereby to prevent the first and second sealing portions 12A, 12B sealed in engagement with the first and second elements F, C from being further deformed.

Specifically, the seal ring body 14 includes outer inclined surfaces 28b, 30b facing radially outward and having an annular shape approaching toward each other as they go radially outward, and inner inclined surfaces 28a, 30a facing radially inward and having a shape approaching toward each other as they go radially outward, and formed between the outer inclined surfaces 28b, 30b and the inner inclined surfaces 28a, 30a are ridge portions 28, 30. When the metal seal ring 10 is clamped between the first and second elements, extremities of the first and second sealing portions 12A, 123 engage the first and second elements F, C respectively and, when the first and second elements F, C are brought toward each other by tightening the bolts B, the first and second sealing portions 12A, 12B are resiliently deformed so as to approach with respect to each other, whereby the first and second sealing portions 12A, 12B are sealed in engagement between the first and second elements F, C by a required pressure. The ridge portions 28, 30 of the seal ring body engage the first and second elements at a moment when sealed engagement as described above of the first and second sealing portions 12A, 12B with respect to the first and second elements is achieved to prevent the first and second elements from substantially approaching further toward each other, so that occurrence of substantial plastic deformation or occurrence of breakage due to exertion of an excessive force onto the first and second sealing portions are prevented. Here, the sealed engagement between the first and second sealing portions 12A, 12B and the first and second elements F, C may need only be capable of preventing occurrence of leakage when the fluid pressure P is applied to the metal seal ring from radially inside.

In the pressure test, the metal seal ring 10 was formed of stainless steel so as to have such dimensions in a state in which the bolts and nuts are not tightened that the distance between the extremities 12c, 12d of the first and second sealing surfaces 12a and 12b in the axial direction was 3.1 mm and the diameter thereof was 15.8 mm, and the distance between the ridge portions 28, 30 in the axial direction was 3.0 mm and the diameter thereof was 18.0 mm. Then the duct T and a portion inside of the metal seal ring 10 were filled with water in a state in which the bolts and nuts are tightened to bring the first and second elements F, C into engagement with the ridge portions 28, 30 of the seat metal body and hence approach toward each other was substantially stopped, and a pressure of 60 MPa was applied to the water with pressurizing means, not shown. Consequently, there was no water leaked out through between the metal seal ring 10 and the first and second elements F, C during the experiment for 20 days. The pressure was lowered from 60 MPa to the order of 59 MPa, which was considered to be caused by leakage of pressure on the side of the pressurizing device and the measuring device. The similar pressure test was conducted on the metal seal rings shown in FIG. 2 to FIG. 4 described below, and the similar results were obtained. The reason of pressurization at 60 MPa described above was that the limit of pressurization of the test device used for the pressure (leak) test was 60 MPa. Although the leak test examination using liquefied hydrogen at 70 MPa was conducted with another device, the similar results were obtained. Since the metal seal ring according to the present invention is configured to generate sealed engagement at higher pressures corresponding to the fluid pressure applied thereto, it is thought to be possible to achieve an adequate sealing even at pressures equal to or higher than 70 MPa, which is already tested, until the metal material of the metal seal ring itself is broken due to the pressure.

Figure 2:
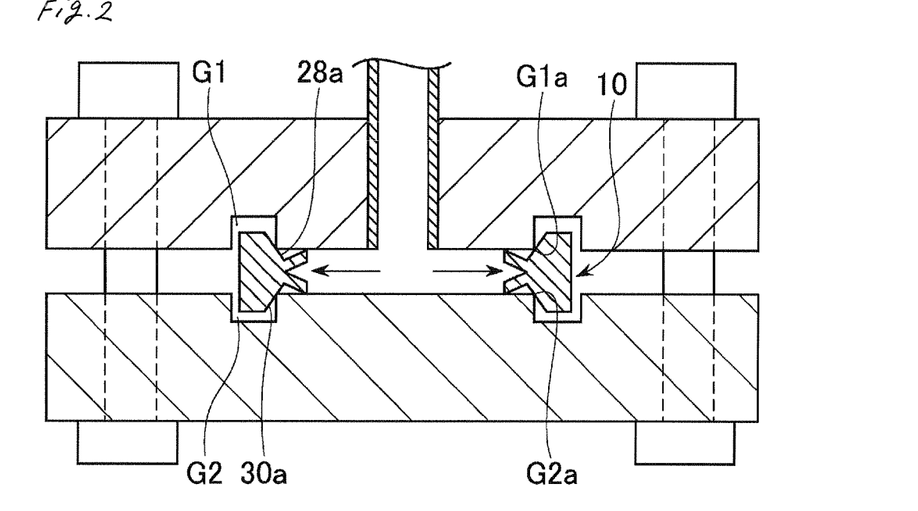
FIG. 2 is the similar drawing to FIG. 1 showing a metal seal ring according to a second embodiment of the invention.

FIG. 2 shows a second embodiment of the metal seal ring 10 according to the present invention, and is somewhat different in cross-sectional shape of the seal ring body 14 in comparison with the metal seal ring in FIG. 1. In other words, the seal ring body 14 has a substantially rectangular shape in lateral cross section as a whole, and allows the seal ring body 14 to be set in annular grooves G1, G2 formed on the first and second elements F, C. In this embodiment, the inclined surfaces 28a, 30a of the seal ring body 14 engage radially inside edges G1a, G2a of the grooves G1, G2 respectively to prevent the first and second elements F, C from moving toward each other.

Figure 3:
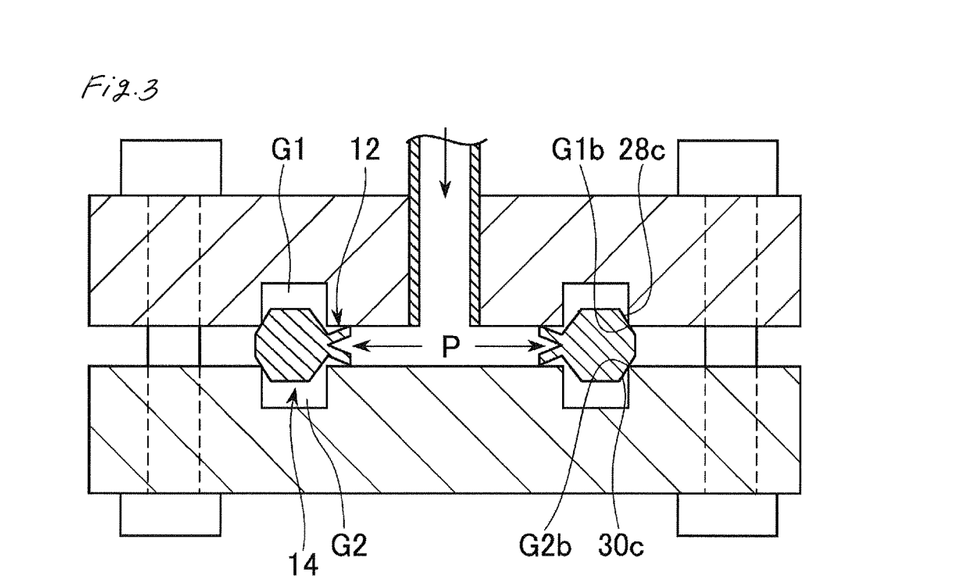
FIG. 3 is the similar drawing to FIG. 1 showing a metal seal ring according to a third embodiment of the invention.

FIG. 3 shows a third embodiment of the metal seal ring 10 according to the present invention. In other words, in this metal seal ring 10, the seal ring body 14 has a substantially hexagonal shape in cross section as a whole and is engaged with the annular grooves G1, G2 provided on the first and second elements F, C. Annular inclined surfaces 28c, 30c facing radially outward of the seal ring body 14 engage radially outside edges G1b, G2b of the annular grooves G1, G2 to prevent the first and second elements F, C from moving toward each other.

Figure 4:
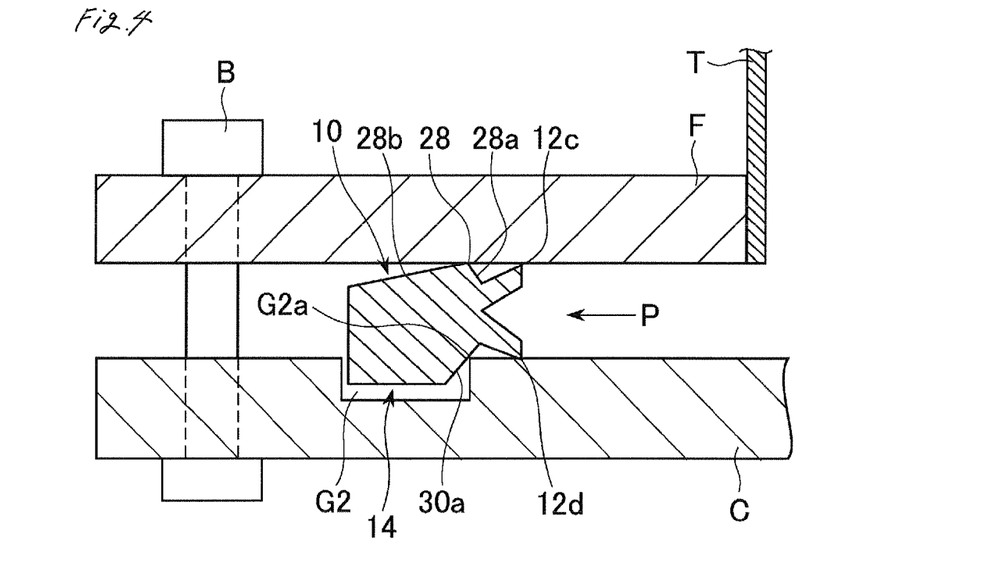
FIG. 4 is the similar drawing to FIG. 1 showing a metal seal ring according to a fourth embodiment of the invention.

FIG. 4 shows a fourth embodiment of the metal seal ring 10 according to the present invention. In other words, in this metal seal ring 10, the lateral cross section of the seal ring body 14 is similar to the one shown in FIG. 1. However, the inclined surface 30b in FIG. 1 is not provided on a lower surface in the drawing, and a surface parallel to the first and second elements F, C is provided. In addition, there is no annular groove on the first element F, and the seal ring body 14 is configured to be engaged within the annular groove G2 provided on the second element C, the inclined surface 30a engages the radially inside edge G2a of the annular groove G2 to prevent the first and second elements F, C from moving toward each other together with the ridge portion 28 to be engaged with the first element F.

Figure 5:
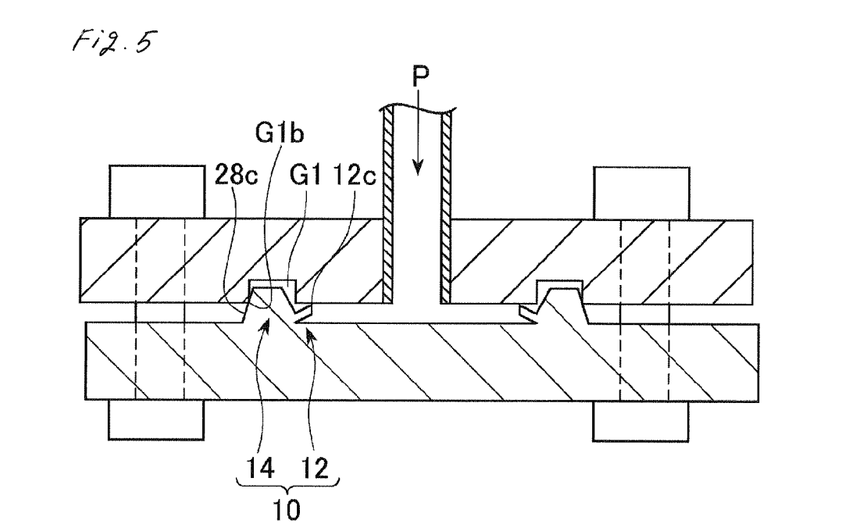
FIG. 5 is the similar drawing to FIG. 1 showing a metal seal ring according to a fifth embodiment of the invention.

FIG. 5 shows an embodiment in which the metal seal ring 10 shown in FIG. 3 is integrally formed with the second element C. In other words, the metal seal ring 10 according to this embodiment includes the annular sealing member 12 provided so as to extend radially inward from above the second element C toward the first element, and the annular seal ring body 14 having a trapezoidal shape in annular lateral cross section provided radially outside of the sealing portion, and is configured in such a manner that the extremity 12c of the sealing surface provided at the extremity of the sealing member 12 seals the first element F in engagement, and the seal ring body 14 is set into the annular groove G1 formed on the first element F, so that the radially outside inclined surface 28c of the seal ring body 14 engages the radially outside edge G1b of the annular groove G1.

In FIG. 1 to FIG. 5, examples in which a metal seal element according to the present invention is set in a pressure resistance measuring device has been described. In FIG. 6 to FIG. 11, examples in which the metal seal ring according to the present invention is provided between flanges F, F corresponding to the first and second elements described above, which are provided at duct end portions of the duct apparatus are shown. In the metal seal rings shown in FIG. 6 to FIG. 11, the same parts as the metal seal rings shown in FIG. 1 to FIG. 5 are designated by the same reference numerals.

Figure 6:
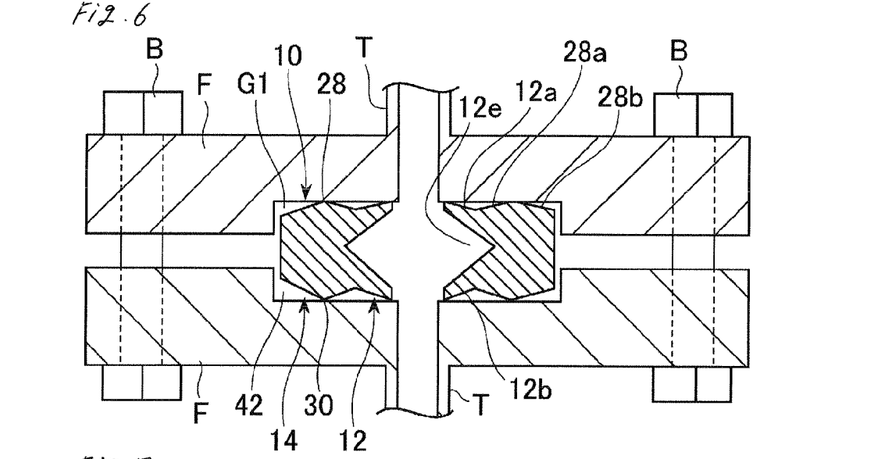
FIG. 6 is a drawing showing a state in which a metal seal ring similar to the metal seal ring according to the first embodiment of the invention is set between opposed flanges provided at duct end portions.

FIG. 6 shows a state in which substantially the same seal ring as that shown in FIG. 1 is set between the flanges F, F at the duct end portions. The flanges are formed on opposed surfaces thereof with depressions G1, G2 having a center at axial lines thereof. These depressions F1, G2 have a circular shape when viewing a plane orthogonal to the axial lines, and are configured to receive the metal seal ring 10 having the same circular shape. With the provision of these depressions, aligning of the metal seal ring 10 with respect to the flanges are facilitated and, in addition, reliable holding of the metal seal ring is achieved.

Figure 7:
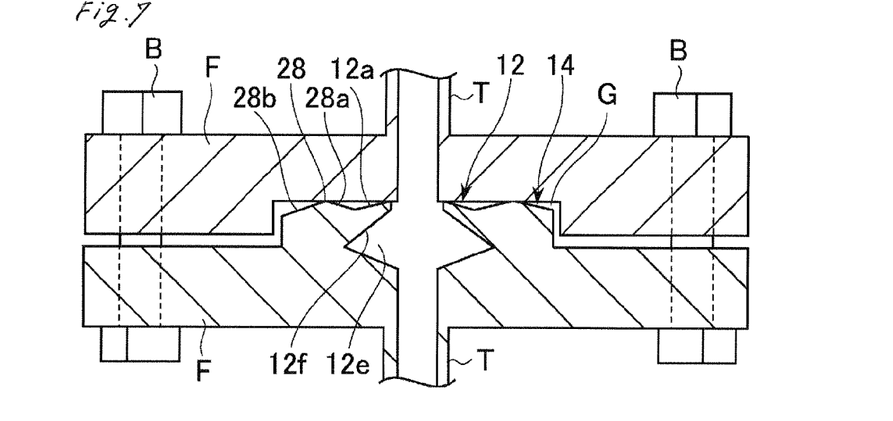
FIG. 7 is a drawing showing an embodiment similar to FIG. 5, showing a state in which the metal seal ring according to the present invention is formed integrally with one of the flanges and is set in a depression formed on the other flange.

FIG. 7 shows an example in which the metal seal ring 10 is formed integrally with one of the flanges and is arranged in the depression G1 formed on the other flange in the same manner as FIG. 5.

Figure 8:
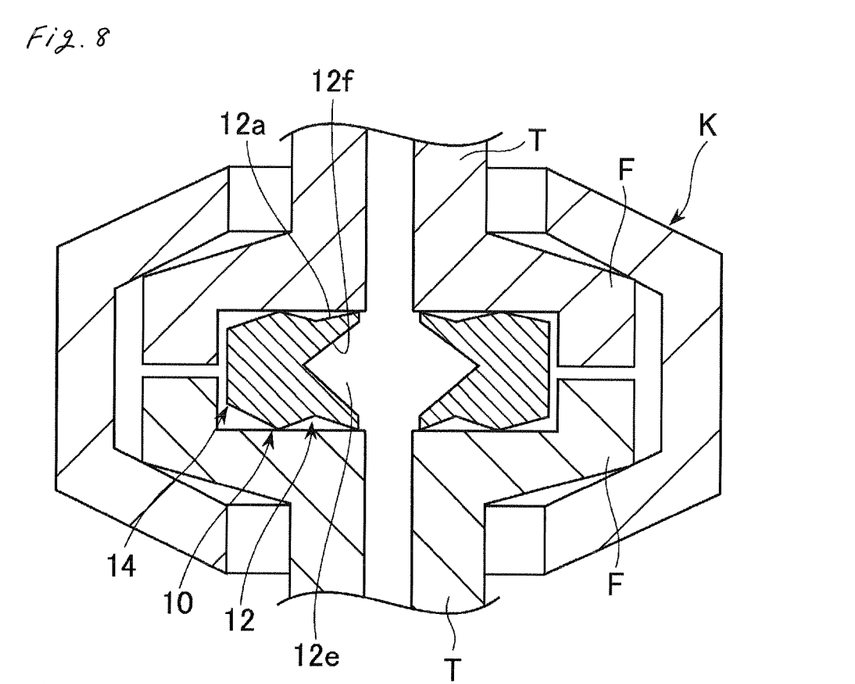
FIG. 8 is a drawing showing an example in which the flanges having the metal seal ring according to the present invention clamped therebetween are tightened by a circular clamp having a semi-circular clamp member pivotably fitted to each other at one end of each.

FIG. 8 is substantially the same as FIG. 6, and shows an example in which an annular clamp K made up of two semi-circular clamp members fitted to each other at one end of each is used for moving the opposed flanges toward each other instead of the bolts and nuts B.

Figure 9:
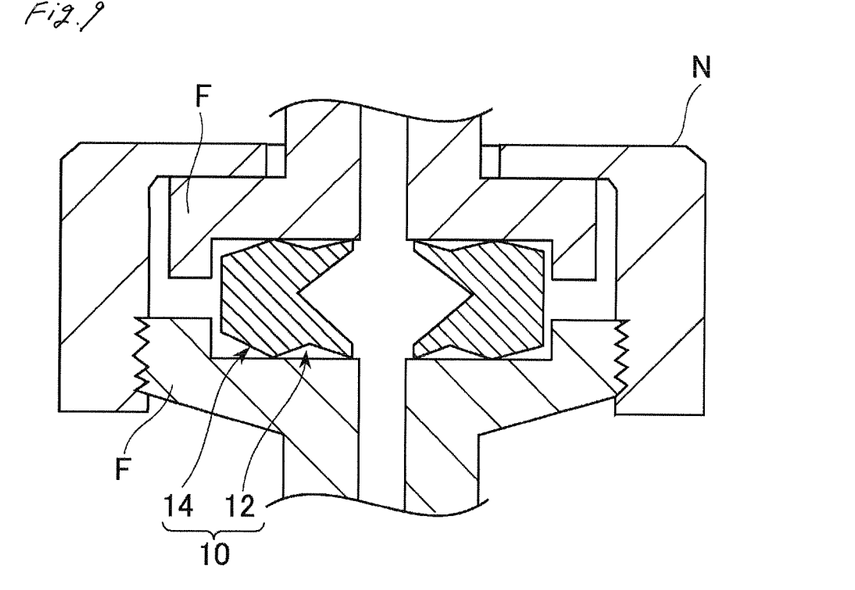
FIG. 9 is a drawing showing an example in which the flanges having the metal seal ring according to the invention clamped therebetween are fitted by screws.

FIG. 9 shows an example in which a male thread is formed on an outer peripheral surface of one of the flanges so as to allow a nut N covered on the other flange to be screwed on the male thread for moving the flanges toward each other.

Figure 10:
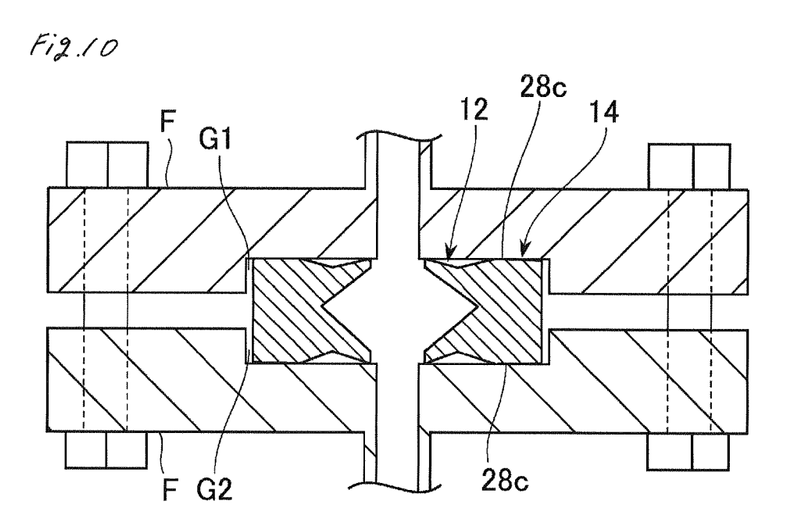
FIG. 10 is a drawing similar to FIG. 6, showing an example in which a shape of a seal ring body of the metal seal ring is different.

FIG. 10 shows a substantially same example as that shown in FIG. 6, in which the seal ring body 14 includes surfaces 28c extending in parallel to the first and second elements, and these surfaces 28c engage bottom surfaces of the annular grooves G1, G2 formed on the first and second elements.

The embodiments of the metal seal ring according to the invention have been described thus far, the invention is not limited to these embodiments. For example, the seal ring body is required to be configured to avoid exertion of the excessive force onto the sealing member from the first and second elements which clamp the same and hence it may need only have such a shape in the elementary sense. Although the sealing portions of the sealing member in the illustrated embodiments are formed to have a shape approaching the element to be engaged as they go radially inward away from the seal ring body, it may be formed to extend while keeping in contact with the element to be engaged. In this case as well, the sealing portion is pressed toward the element to be engaged by the pressure that the pressure receiving surface receives, and is brought into sealed engagement with a strong pressure.

The invention claimed is:

1. An annular metal seal ring set between opposite and parallel first and second surfaces, the metal seal ring comprising:
   an annular seal ring body further comprising
      a pair of annular opposite and parallel body surfaces each having respective radially outer and radially inner edges and,
      a pair of annular non-parallel surfaces that respectively extend from the radially inner edges of the body surfaces and are straight-tapered toward each other as they go radially inward; and
   an annular sealing member further comprising first and second resiliently deformable straight-tapered sealing members, the deformable sealing members projecting radially inwardly from the seal ring body and inclined axially outwardly toward the first and second surfaces, respective ends of the deformable sealing members resiliently deformed against the first and second surfaces when the seal ring body is clamped between the surfaces;
   the first and second deformable straight-tapered sealing members internally meeting one another.

2. An annular metal seal ring for disposing between opposite and parallel first and second surfaces, the metal seal ring comprising:
   an annular seal ring body further comprising
      a pair of annular opposite and parallel body surfaces each having respective radially outer and radially inner edges and,
      a pair of annular non-parallel surfaces that respectively extend from the radially inner edges of the body surfaces and are straight-tapered toward each other as they go radially inward; and
   an annular sealing member further comprising first and second resiliently deformable straight-tapered sealing members, the deformable sealing members projecting radially inwardly from the seal ring body and inclined axially outwardly and projecting axially outwardly further than the seal ring body parallel body surfaces;
   the first and second deformable straight-tapered seating members internally meeting one another.

3. The seal ring of claim 1, wherein the opposite and parallel first and second surfaces are planar.

4. The seal ring of claim 3, wherein the opposite and parallel first and second surfaces are planar and respective surfaces are integrous.

* * * * *